United States Patent
Izdepski et al.

(10) Patent No.: US 8,719,001 B1
(45) Date of Patent: May 6, 2014

(54) REMOTE CONFIGURATION OF WIDGETS

(75) Inventors: Erich J. Izdepski, Falls Church, VA (US); Wing K. Lee, Ashburn, VA (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 622 days.

(21) Appl. No.: 12/323,463

(22) Filed: Nov. 25, 2008

(51) Int. Cl.
*G06F 9/45* (2006.01)

(52) U.S. Cl.
USPC .......................................................... 703/22

(58) Field of Classification Search
USPC .......................................................... 703/22
See application file for complete search history.

(56) References Cited

U.S. PATENT DOCUMENTS 6,802,058 B2 * 10/2004 Banavar et al. ............... 717/138
2007/0130541 A1 * 6/2007 Louch et al. .................. 715/804

OTHER PUBLICATIONS

Greenberg et al. "Phidgets: Easy Development of Physical Interfaces through Physical Widgets." ACM 2001.*

* cited by examiner

*Primary Examiner* — Saif Alhija

(57) ABSTRACT

A system is provided for remote configuration of widgets. The system includes a device, a processor, a configuration application, and a user interface. The user interface accesses the configuration application. The configuration application, when executed by the processor, selects the device and uploads a state of the device to the configuration application. The configuration application executes a simulator to simulate the device for a software widget based on the state and generates a configuration for at least one of the software widget and the device based on executing the simulator. The configuration application also verifies the configuration on the simulator and downloads the configuration to the device.

14 Claims, 5 Drawing Sheets

US 8,719,001 B1

REMOTE CONFIGURATION OF WIDGETS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A software widget is portable code that is installed and executed in a runtime environment without additional compilation. For example, a personal computer user may download a weather software widget to their personal computer, where the weather software widget may be capable of displaying a weather report whenever the personal computer is powered on. The user does not have to initiate the weather software widget each time, nor does the user have to compile the weather software widget for the weather software widget to be operational. The user may also download another weather software widget on another device, such as a mobile phone, which may display a weather report for the other device. Other types of popular software widgets may display stock market reports, currency exchange reports, a slide show of user-defined photographs, the latest news headlines that include corresponding Internet links, a personal notepad, a contact list, or play music for Internet radio stations. Users may define preferences for their software widgets, such as selecting the stocks to be displayed for the stock market reports. A hardware widget is a hardware device that has a limited integrated user interface and executes software based on at least partially configurable data stored on the hardware widget. Examples of hardware widgets include a digital watch, a mobile broadband card, a router, a set top box, and a wireless interface device.

SUMMARY

In some embodiments, a system is provided for remote configuration of widgets. The system includes a device, a processor, a configuration application, and a user interface. The user interface accesses the configuration application. The configuration application, when executed by the processor, selects the device and uploads a state of the device to the configuration application. The configuration application executes a simulator to simulate the device for a software widget based on the state and generates a configuration for at least one of the software widget and the device based on executing the simulator. The configuration application also verifies the configuration on the simulator and downloads the configuration to the device.

In other embodiments, a method is provided for remote configuration of widgets. A configuration application is accessed to select a device. A state of the device is uploaded to the configuration application. A simulator is executed by the configuration application to simulate the device for a software widget based on the state. A configuration is generated for at least one of the software widget and the device based on executing the simulator by the configuration application. The configuration is verified on the simulator executed by the configuration application. The configuration is downloaded from the configuration application to the device.

In still other embodiments, a system is provided for remote configuration of widgets. The system includes a hardware widget, a processor, a configuration application, and a user interface. The user interface accesses the configuration application. The configuration application selects the hardware widget and uploads a state of the hardware widget to the configuration application. The configuration application executes a simulator to simulate the hardware widget based on the state and generates a configuration for the hardware widget based on executing the simulator. The configuration application also verifies the configuration on the simulator and downloads the configuration from the configuration application to the hardware widget.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
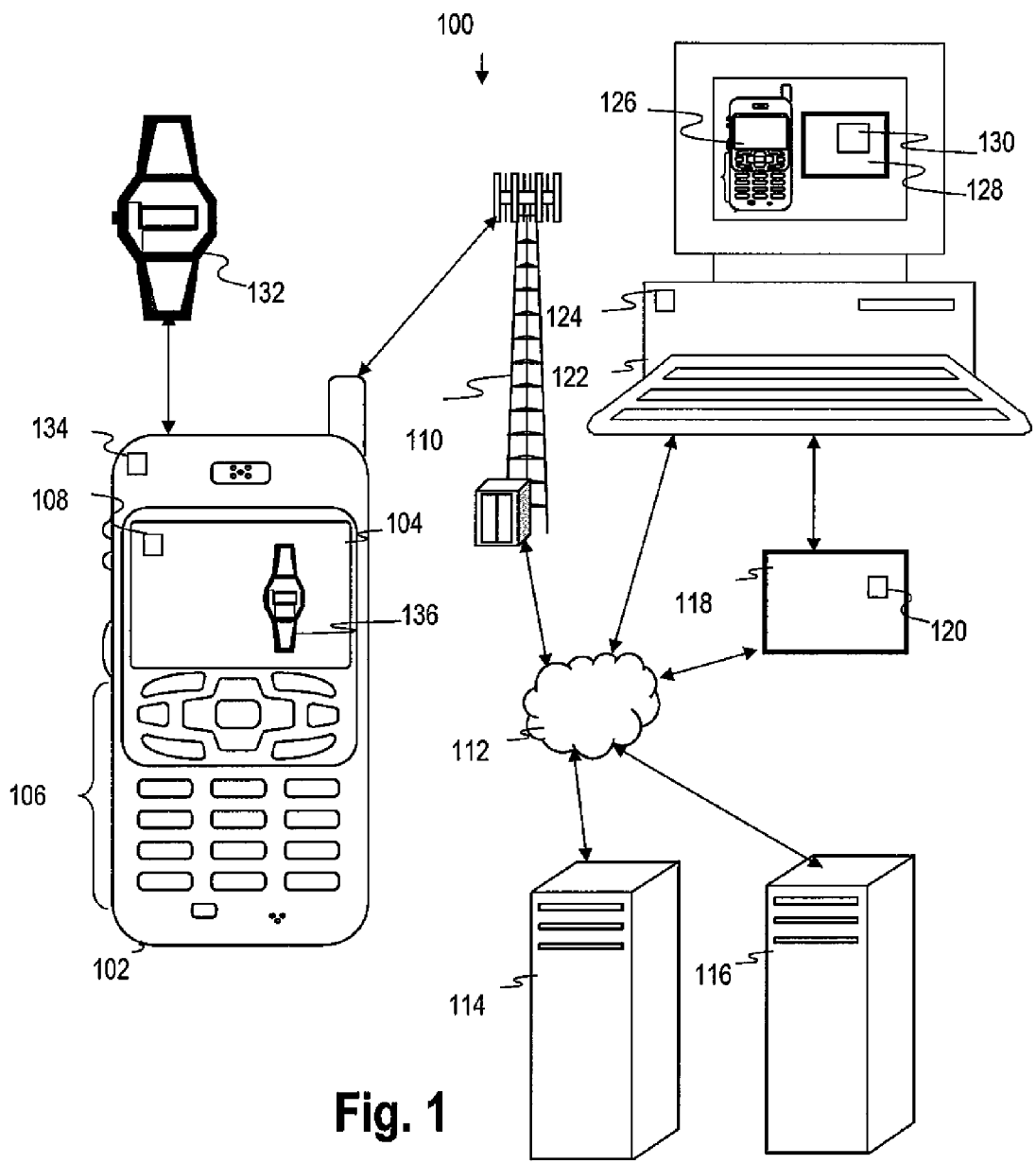
FIG. 1 shows an illustrative wireless communications system for remote configuration of widgets.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some devices that execute software widgets may have a limited user interface and/or a reduced screen size, which may make configuring software widgets more challenging. For example, a user wants a weather software widget to execute on their mobile phone, but the mobile phone's small screen size may make configuration of the weather software widget difficult because some of the configuration instructions may be difficult to read on the small mobile phone display. In another example, a user wants a weather software widget to execute on their digital picture frame, periodically alternating with displayed photographs of the user's family and friends. However, the digital picture frame's limited user interface may make configuration of the weather software widget difficult because the user may be required to execute the configuration instructions by repeatedly pressing a limited number of controls on the digital picture frame in a complicated sequence. Configuration of hardware widgets may also prove to be challenging. For example, changing the time zone setting and an alarm time setting on a digital wristwatch may require a user to repeatedly press a limited number of control stems on the wristwatch in a complicated sequence.

In some embodiments, a system is provided for remote configuration of software widgets. A user may use a configuration application to select the device for software widget configuration and to upload a state of the device to the configuration application via wireless communication. The state of the device may specify a characteristic, a setting, and/or a configuration associated with the device, such as a mobile phone's operating system, display screen size, and display screen resolution. The configuration application executes a simulator to simulate the device for a software widget based on the state of the device. The configuration application may execute a different simulator for each device for which a software widget is to be configured. For example, the display screen displays a simulator that simulates the mobile phone's display screen based on the state information uploaded from the mobile phone.

The configuration application's user interface may be more extensive than the device's user interface, which may enable the user to easily select the desired software widget for the device from a software widget repository. For example, the user may use a mouse to select an icon for a weather software widget from a number of icons for selectable widgets, and then drag and drop the icon for the weather software widget onto the simulator for the mobile phone. The user may use the configuration application's more extensive user interface and larger display screen size to generate a configuration for the software widget and/or the device based on executing the simulator. For example, the user may use the mouse to select the precise color desired for the weather software widget and also determine exactly where the mobile phone's display screen will display the weather software widget. The user may use the configuration application's more extensive user interface and larger display screen to verify that the weather software widget is configured as desired on the simulator. When verification is complete, the user may download the configuration from the configuration application to the device via wireless communication, having easily configured the software widget by using the configuration application's more extensive user interface and larger display screen. The configuration application may store the state of the device and/or the configuration for possible subsequent reuse.

In other embodiments, a system is provided for remote configuration of hardware widgets. A user may use a configuration application on a mobile phone, with a more extensive user interface than a digital wristwatch's user interface, to select the digital wristwatch for configuration and to upload a state of the digital wristwatch to the mobile phone's configuration application via wireless communication. The state of the digital wristwatch may specify a characteristic, a setting, and/or a configuration associated with the digital wristwatch, such as the digital wristwatch's operating system, display screen size, and display screen resolution. The mobile phone's configuration application executes a simulator to simulate the digital wristwatch based on the state of the digital wristwatch. For example, the mobile device display screen displays a simulator that simulates the digital wristwatch's display screen based on the state information uploaded from the digital wristwatch. The user may use the mobile phone's more extensive user interface and larger display screen size to generate a configuration for the digital wristwatch based on executing the simulator. For example, the user may use the mobile phone's keys to change the displayed time for the digital wristwatch based on a change in time zones and to set an alarm for the digital wristwatch. The user may use the mobile phone's more extensive user interface and larger display screen to verify that the digital wristwatch is configured as desired on the simulator. When verification is complete, the user may download the configuration from the mobile phone to the digital wristwatch via wireless communication, having easily configured the digital wristwatch by using the mobile phone's more extensive user interface and larger display screen. The mobile phone may store the state of the digital wristwatch and/or the configuration for possible subsequent reuse.

FIG. 1 shows a wireless communications system 100 that illustrates the context for the present disclosure's systems and methods. The system 100 includes a device 102. Though illustrated as a mobile phone, the device 102 may take various forms with a reduced screen size, including a mobile telecommunication device, a mobile handset, a personal digital assistant (PDA), a handheld gaming device, a handheld wireless mobile device, a pager, a digital camera, a digital music player, and a digital calculator. In some embodiments, the device 102 may take various forms with a limited user interface, including a digital picture frame, a doll, a mobile telecommunication device, a mobile handset, a personal digital assistant, a handheld gaming device, a handheld wireless mobile device, a pager, a digital camera, a digital music player, and a digital calculator. Many suitable devices 102 combine some or all of these functions.

The device 102 may include a display 104 and/or a touch-sensitive surface or keys 106 with which the user can interact. The device 102 may present options for the user to select, controls for the user to actuate, and/or cursors or other indicators for the user to direct. The device 102 may further accept data entry from the user, including numbers to dial or various parameter values for configuring the operation of the device 102. The device 102 may further execute one or more software or firmware applications in response to user commands. These applications may configure the device 102 to perform various customized functions in response to user interaction, such as a first software widget 108.

In the illustrative system 100, the device 102 communicates through a base transceiver station 110 and a wired or wireless network 112 to access information on various servers, such as a communication server 114 and a content server 116. The content server 116 may store software widgets for the communication server 114 to provide to devices 102. While one base transceiver station 110 is shown in FIG. 1, other base transceiver stations 110 could be present. The system 100 may also include a digital picture frame 118, which may have a second software widget 120, which also communicates via the network 112. Additionally, the system 100 may include a computer 122 which communicates via the network 112. Although depicted as a personal computer, the computer 122 may be a server, a mobile computer, a portable computer, a tablet computer, a laptop computer, or a desktop computer. In comparison to the device 102, which has a user interface that includes the keys 106, the display 104, and a pointer on the display 104, the computer 122 has a user interface that includes a larger display screen, a pointer, and a full qwerty keyboard.

The computer 122 executes a first configuration application 124 to depict a simulator 126 for the device 102 and a simulator 128 for the digital picture frame 118. The simulator 128 for the digital picture frame 118 includes a simulation 130 of the second software widget 120 that resides on the digital picture frame 118. Although FIG. 1 depicts two simulators 126-128, the computer 122 may display any number of simulators 126-128. While the computer 122 displays the simulator 126 that depicts the device 102, the simulator 126 may depict only the display 104 for the device 102. In order to simulate the simulator 128 and to remotely configure the second software widget 120, the computer 122 may communicate directly with the digital picture frame 118 via wireless communication, such as Bluetooth communication, wireless fidelity (WiFi) communication, or near field communication (NFC).

Furthermore, the system 100 includes a hardware widget 132, which is depicted in FIG. 1 as a digital wristwatch. Additionally, the device 102 has a device processor to execute software or firmware applications in response to user commands, such as a second configuration application 134 to simulate a simulator 136 for the hardware widget 132, which is displayed on the display 104. While the display 104 displays the simulator 136 that depicts the hardware widget 132, the simulator 136 may depict only the display for the hardware widget 132. In order to simulate the simulator 136 and to remotely configure the hardware widget 132, the mobile device 102 may communicate directly with the hardware widget 132 via wireless communication, such as Bluetooth communication, WiFi communication, or NFC.

Figure 2:
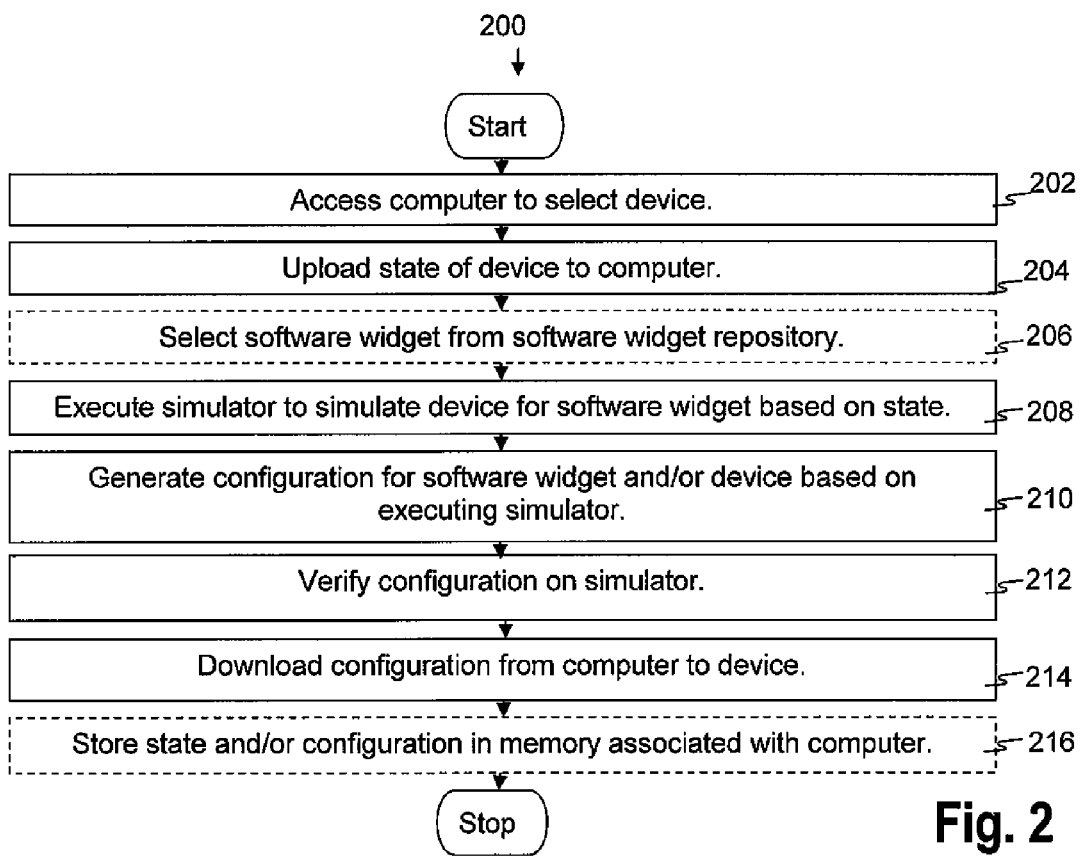
FIG. 2 shows a flowchart of a method for remote configuration of widgets according to some embodiments of the present disclosure.

FIG. 2 is a flowchart illustrating a method 200 for remote configuration of widgets according to some embodiments of the present disclosure. The method can be used to remotely configure software widgets.

In box 202, a configuration application is accessed to select a device. For example, a user of the system 100 uses the keyboard, the display screen, and the display screen's pointer for the first configuration application 124 to select the device 102 for remotely configuring a widget. Alternatively, the user may select another device, such as the digital picture frame 118, instead of the device 102.

In box 204, a state of the device is uploaded to the configuration application. For example, the first configuration application 124 uploads a state of the device 102 via wireless communication. The state may include a characteristic, a setting, and/or a configuration associated with the device 102. For example, the state of the device 102 includes the size of the display 104, the resolution for the display 104, and the operating system that are associated with the device 102.

Uploading the state of the device 102 may include determining whether a state of the device 102 stored in a storage associated with the first configuration application 124 matches a state of the device 102 currently associated with the device 102. Uploading the state of the device 102 also may include uploading the state of the device 102 currently associated with the device 102 from the device 102 in response to a determination that the state of the device 102 stored in the storage associated with the first configuration application 124 does not match the state of the device 102 currently associated with the device 102. Uploading the state of the device 102 may further include uploading the state of the device 102 stored in the storage in response to a determination that the state of the device 102 stored in the storage associated with the first configuration application 124 matches the state of the device 102 currently associated with the device 102. For example, the first configuration application 124 determines whether the state of the device 102 that is already stored in a storage associated with the first configuration application 124 matches the current state of the device 102. If the state already stored in storage does not match the current state, the first configuration application 124 uploads the current state from the device 102. If the state already stored in storage matches the current state, the first configuration application 124 uploads the state from the storage associated with the first configuration application 124.

In box 206, a software widget is optionally selected from a software widget repository. For example, the first configuration application 124 selects a weather software widget from a software widget repository that also includes a stock market software widget and a calendar software widget. Alternatively, the first configuration application 124 uploads the weather software widget from the device 102 when the first configuration application 124 uploads the state from the device 102.

In box 208, a simulator is executed by the configuration application to simulate the device for a software widget based on the state. For example, the first configuration application 124 executes the simulator 126 to simulate the device 102 for the weather software widget based on the size of the display 104, the resolution for the display 104, and the operating system of the device 102. The simulator 126 may be one of multiple simulators 126-128, wherein each of the simulators 126-128 corresponds to one type of device 102 based on an operating system, a screen size, a form factor and/or an interface associated with the type of device 102. For example, the simulator 126 for the device 102 is one of the simulators 126-128 displayed by the computer 122. The simulator 126 corresponds to device 102 based on the operating system, the screen size, the form factor and the interface associated with the device 102. The simulator 128 corresponds to the digital picture frame 118 based the operating system, the screen size, the form factor and the interface associated with the digital picture frame 118.

In box 210, a configuration is generated for at least one of the software widget and the device based on executing the simulator by the first configuration application 124. For example, the first configuration application 124 generates a configuration for the weather software widget 108 and/or the device 102 based on executing the simulator 126. Generating the configuration may include generating code based on user preferences selected for executing the simulator 126 by the first configuration application 124, wherein the code enables the device 102 to execute the widget 108 based on the user preferences. For example, the first configuration application 124 generates code based on user preferences selected for executing the simulator 126, such as the geographic location for the weather software widget 108 and how often to update the weather software widget 108. The generated code enables the device 102 to execute the weather software widget 108 based on the user preferences for geographic location and update frequency.

In box 212, the configuration is verified on the simulator executed by the configuration application. For example, the first configuration application 124 verifies the configuration on the simulator 126, which simulates how the first software widget 108 should execute on the device 102. The configuration may include a display layout and/or a functional setting associated with the first software widget 108. For example, the configuration specifies that the first software widget 108 is to be displayed on upper left corner of the display 104 and that the first software widget 108 is displayed whenever the device 102 is initially turned on.

In box 214, the configuration is downloaded from the configuration application to the device. For example, the first configuration application 124 downloads the configuration for executing the first software widget 108 to the device 102 via wireless communication.

In box 216, at least one of the state and the configuration is optionally stored in a storage associated with the configuration application. For example, the configuration first configuration application 124 stores the size of the display 104, the resolution for the display 104, and the operating system that are associated with the device 102, as well as the configuration for executing the first software widget 108, in storage for possible future reference.

Figure 3:
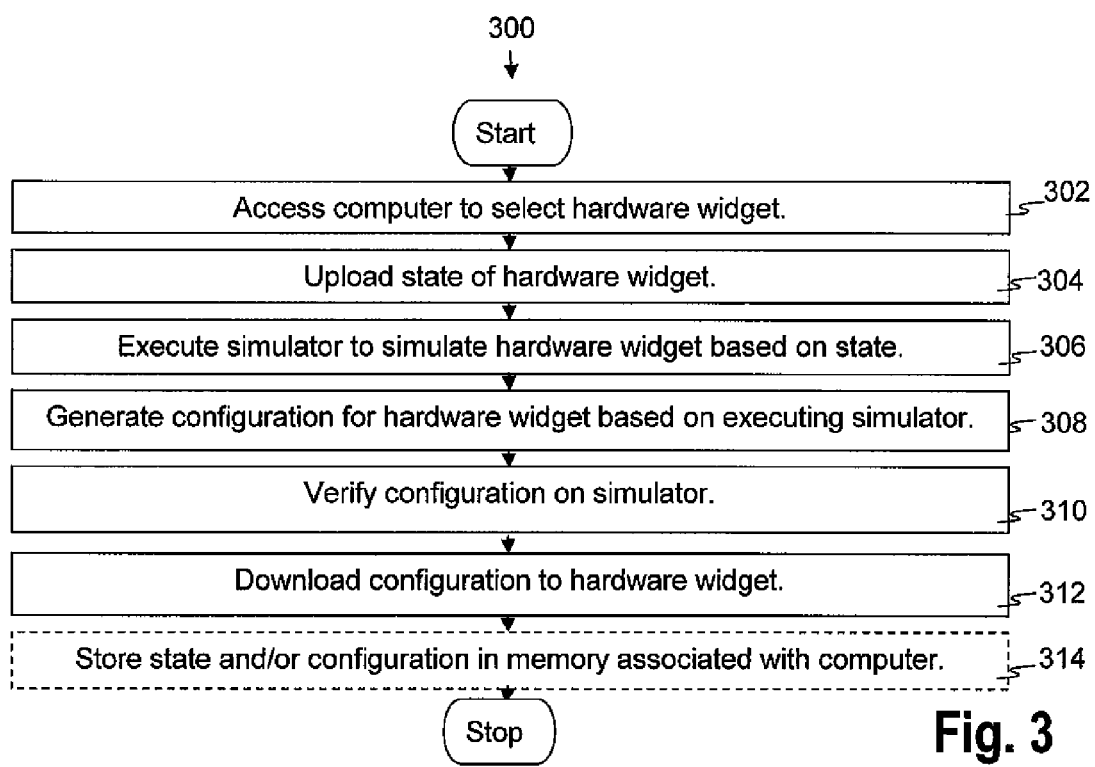
FIG. 3 shows a flowchart of another method for remote configuration of widgets according to some embodiments of the present disclosure.

FIG. 3 is a flowchart illustrating a method 300 for remote configuration of widgets according to some embodiments of the present disclosure. The method can be used to remotely configure hardware widgets.

In box 302, a configuration application is accessed to select a hardware widget. For example, a user of the system 100 uses the display 104 and the keys 106 for the device 102 to access the second configuration application 134 that resides on the device 102 to select the hardware widget 132. Alternatively, the user may use the display 104 and the keys 106 for the device 102 to access the computer 122 to select the hardware widget 132.

In box 304, a state of the hardware widget is uploaded to the configuration application. For example, the second configuration application 134 uploads a state of the hardware widget 132. The state may include a characteristic, a setting, and/or a configuration associated with the hardware widget 132. For example, the state specifies that the hardware widget 132 is a specific type of a digital wristwatch that includes a specific type of software and that the digital wristwatch is set for a specific time zone and a specific alarm time.

In box 306, a simulator is executed by the configuration application to simulate the hardware widget based on the state. For example, the second configuration application 134 executes the simulator 136 to simulate the hardware widget 132 based on the specific type of digital wristwatch, the specific type of software, and the settings for the digital wristwatch. The simulator 136 may be one of multiple simulators, wherein each of the simulators corresponds to one type of hardware widget 132 based on at least one of an operating system, a screen size, a form factor and/or an interface associated with the one type of hardware widget 132. For example, the simulator 136 is based on the wristwatch operating system, the wristwatch screen size, the wristwatch form factor and the wristwatch interface.

In box 308, a configuration is generated for the hardware widget based on executing the simulator by the configuration application. For example, the second configuration application 134 generates a configuration for the hardware widget 132 based on executing the simulator 136. The configuration may include a display layout and a functional setting associated with the hardware widget 132. For example, the configuration specifies whether the hardware widget 132 displays time based on a 24 hour clock notation or a 12 hour clock notation and for what time the wristwatch alarm is set.

In box 310, the configuration is verified on the simulator executed by the configuration application. For example, the second configuration application 134 verifies the configuration for the time zone and alarm settings on the simulator 136.

In box 312, the configuration is downloaded from the configuration application to the hardware widget. For example, the second configuration application 134 downloads the configuration for the time zone and alarm settings to the hardware widget 132.

In box 314, at least one of the state and the configuration is optionally stored in a storage associated with the configuration application. For example, the second configuration application 134 stores the specific type of digital wristwatch, the specific type of software for the digital wristwatch, the settings for the digital wristwatch, and the configuration for the time zone and alarm settings in a storage associated with the device 102 for possible future reference.

Figure 4:
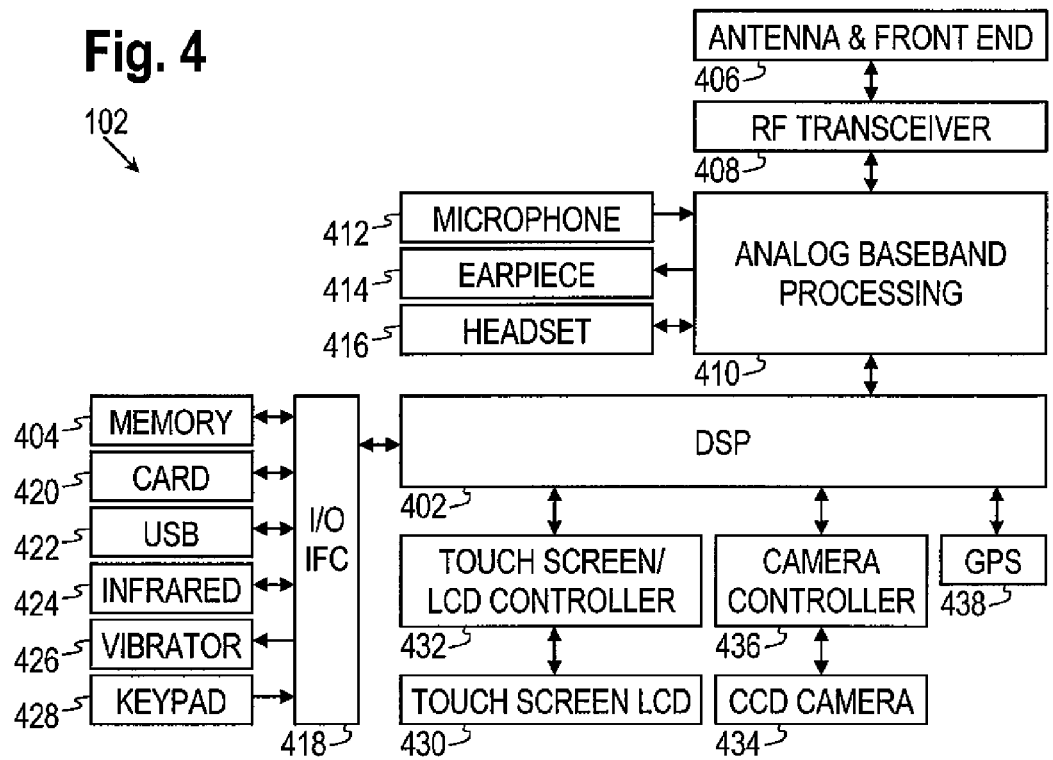
FIG. 4 shows a block diagram of an illustrative device.

FIG. 4 shows a block diagram of the device 102. The device 102 includes a digital signal processor (DSP) 402 and a memory 404. As shown, the device 102 may further include an antenna and front end unit 406, a radio frequency (RF) transceiver 408, a baseband processing unit 410, a microphone 412, an earpiece speaker 414, a headset port 416, an input/output interface 418, a memory card 420, a universal serial bus (USB) port 422, an infrared port 424, a vibrator 426, a keypad 428, a liquid crystal display (LCD) with a touch sensitive surface 430, a touch screen/LCD controller 432, a charge-coupled device (CCD) camera 434, a camera controller 436 and a global positioning system (GPS) sensor 432. Some other type of display may be substituted for the LCD with the touch sensitive surface 430.

The DSP 402 or some other form of controller or central processing unit operates to control the various components of the device 102 in accordance with embedded software or firmware stored in the memory 404. In addition to the embedded software or firmware, the DSP 402 may execute other applications stored in the memory 404 or made available via information carrier media such as portable data storage media like the memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402 to execute the methods for the heads up security display.

The antenna and front end unit 406 converts between wireless signals and electrical signals, enabling the device 102 to send and receive information from a cellular network or some other available wireless communications network or from a peer handset 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 may provide frequency shifting, e.g., converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The baseband processing unit 410 may provide channel equalization, decoding, and signal demodulation to extract information from received signals, and may code and modulate information to create transmit signals, and may provide filtering for signals. To that end, the baseband processing unit 410 includes ports for connecting to the built-in microphone 412 and the earpiece speaker 414 that enable the device 102 to be used as a cell phone. The DSP 402 can also execute the baseband processing.

The DSP 402 can send and receive digital communications with a wireless network via the baseband processing unit 410. The DSP 402 may perform modulation, demodulation, coding, decoding, interleaving, deinterleaving, spreading, despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The input/output interface 418 interconnects the DSP 402 and various memories and interfaces. The memory 404 and the removable memory card 420 may provide software and data to configure the operation of the DSP 402. The infrared port 424 and other optional ports such as a Bluetooth interface or an IEEE 802.11 compliant wireless interface enable the device 102 to communicate wirelessly with other nearby devices 102 and/or wireless base stations. In some contemplated systems, the device 102 is able to wirelessly exchange information at a point-of-sale when placed near a suitable transceiver.

The input/output interface 418 may further connect the DSP 402 to the vibrator 426 that, when triggered, causes the device 102 to vibrate. The vibrator 426 may serve as a mechanism for silently alerting the user to any of various events such as an incoming call, a new text message, and an appointment reminder.

The keypad 428 couples to the DSP 402 via the I/O interface 418 to provide one mechanism for the user to make selections, enter information, and otherwise provide input to the device 102. Another input mechanism may be the touch screen display 430, which may also display text and/or graphics to the user. The display controller 432 couples the DSP 402 to the touch screen display 430.

The CCD camera 434 enables the device 102 to take digital pictures. The DSP 402 communicates with the CCD camera 434 via the camera controller 436. The GPS sensor 438 is coupled to the DSP 402 to decode global positioning system signals, thereby providing at least one technology for the device 102 to determine its location. In another embodiment, a camera operating according to a technology other than charge coupled device cameras may be employed. Alternatively, GPS processing may be provided by a dedicated GPS chip or processor. Various other peripherals may also be included to provide additional functions, e.g., radio and television reception.

Figure 5:
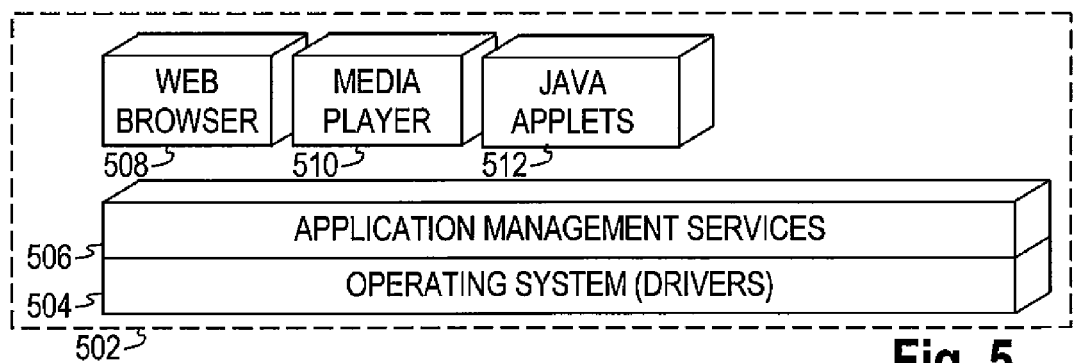
FIG. 5 shows a block diagram of an illustrative software configuration for a device.

FIG. 5 illustrates a software environment 502 that may be implemented by the DSP 402. The DSP 402 executes operating system software 504 that provides a platform from which the rest of the software operates. The operating system generally provides processing resource management support. The operating system software 504 provides drivers for the device hardware to make standardized interfaces available to application software. The operating system software 504 may transfer control between applications running on the device 102. The operating system drivers 504 include application management services ("AMS") 506 that transfer control between applications running on the device 102.

Also shown in FIG. 5 are a web browser application 508, a media player application 510, and JAVA applets 512. The web browser 508 application configures the device 102 to operate as a web browser, allowing the user to enter information into forms and select links to retrieve and view web pages, including content from the content server 116. The media player application 510 configures the device 102 to retrieve and play audio or audiovisual media on its own output components. The JAVA applets 512 may configure the device 102 to provide games, utilities, and other functionality on the device 102. These are further examples of content that may be provided by the content server 116.

Figure 6:
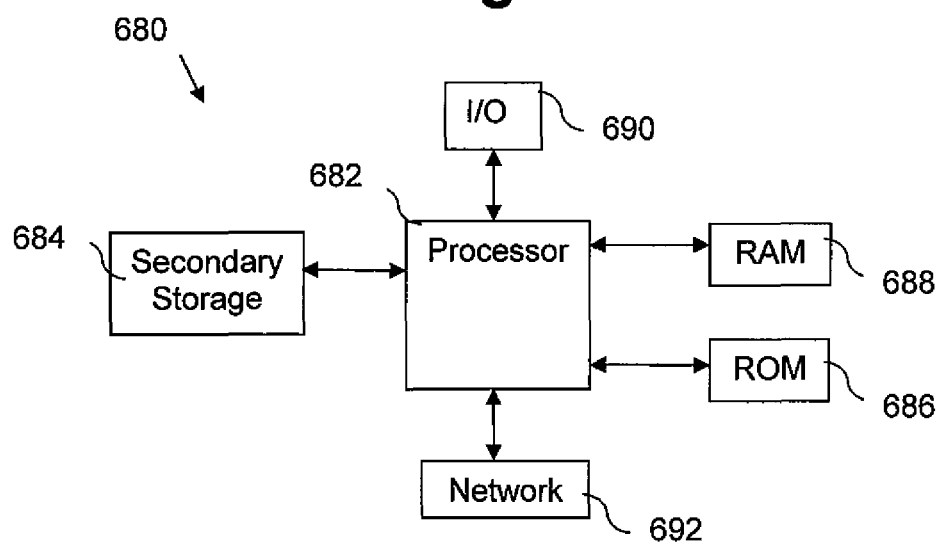
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein, such as the communication server 114. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, Ethernet cards, universal serial bus (USB) interface cards, serial interfaces, token ring cards, fiber distributed data interface (FDDI) cards, near field communication (NFC) cards, wireless fidelity (WiFi) cards, Bluetooth cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for remote configuration of software widgets, comprising:
   a mobile phone device configured to execute a software widget, wherein the software widget is portable code that is installed and executed in a runtime environment without additional compilation; and
   a software widget configuration application having a user interface and executing on a computer device separate from the mobile phone device, wherein the user interface of the software widget configuration application facilitates configuration of programmable features of the software widget by a user of the mobile phone device, and wherein the programmable features of the software widget are also configurable by the user of mobile phone device via a limited user interface of the mobile phone device, and wherein when executed by a processor associated with the computer device, the software widget configuration application causes the processor to:
   upload, from the mobile phone device, the software widget and a state of the mobile phone device to the software widget configuration application, wherein the state of the mobile phone device comprises an indication of an operating system of the mobile phone device and at least one of display screen size and display screen resolution of the mobile phone device,
   execute a device simulator to simulate the mobile phone device in the uploaded state,
   within the device simulator, execute a widget simulator to display via the user interface of the computer device a simulated version of the software widget as it would appear to the user of the mobile phone device when executed on the mobile phone device having the uploaded state,
   update a configuration for the software widget based on user input to the simulated software widget displayed via the user interface, and
   transmit the configuration updates for the software widget to the mobile phone device, wherein the mobile phone device applies the configuration updates to the software widget.

2. The system of claim 1, wherein the simulated version of the mobile phone device executing the software widget is enhanced relative to the limited user interface of the mobile phone device, and wherein the mobile phone device is one of a mobile telecommunication device, a mobile handset, a personal digital assistant, and a handheld wireless mobile device.

3. The system of claim 1, wherein the simulated version of the mobile phone device executing the software widget is enlarged relative to a screen size of the limited user interface of the mobile phone device, and wherein the mobile phone device is one of a mobile telecommunication device, a mobile handset, a personal digital assistant, and a handheld wireless mobile device.

4. The system of claim 1, wherein the computer device comprises one of a server, a mobile computer, a portable computer, a tablet computer, a laptop computer, or a desktop computer.

5. The system of claim 1, wherein the user interface comprises at least one of a display screen, a pointer, or a keyboard.

6. The system of claim 1, wherein the state further comprises at least one of a characteristic, a setting, or a configuration associated with the mobile phone device.

7. The system of claim 1, wherein the software widget configuration application is configured to execute a plurality of simulators, and wherein the plurality of simulators correspond to different types of devices that vary with regard to at least one of an operating system, a screen size, a form factor, or an interface.

8. The system of claim 1, wherein the configuration updates comprise at least one of a display layout or a functional setting associated with the software widget.

9. A computer implemented method for remote configuration of software widgets, comprising:
   accessing a software widget configuration application having a user interface to select a mobile phone device configured to execute a software widget,
   wherein the software widget is portable code that is installed and executed in a runtime environment without additional compilation, wherein the software widget configuration application is executing on a computer device that is separate from the mobile phone device, and wherein the user interface of the software widget configuration application facilitates configuration of programmable features of the software widget by a user of the mobile phone device, wherein the programmable features of the software widget are also configurable by the user of the mobile phone device via a limited user interface of the mobile phone device;

uploading, from the mobile phone device, the software widget and a state of the mobile phone device to the software widget configuration application, wherein the state of the mobile phone device comprises an indication of an operating system of the mobile phone device and at least one of display screen size and display screen resolution of the mobile phone device;

executing, by the software widget configuration application, a device simulator to simulate the mobile phone device in the uploaded state;

within the device simulator, executing, by the software widget configuration application, a widget simulator to display via the user interface a simulated version of the software widget as it would appear to the user of the mobile phone device when executed on the mobile phone device having the uploaded state;

updating a configuration for the software widget based on user input to the simulated software widget displayed via the user interface; and transmitting the configuration updates for the software widget from the software widget configuration application to the mobile phone device.

10. The computer implemented method of claim 9, wherein at least one of uploading the state or transmitting the configuration updates is performed via wireless communication.

11. The computer implemented method of claim 9, wherein uploading the state of the device comprises:

determining whether a state of the mobile phone device stored in a storage associated with the software widget configuration application matches a current state of the mobile phone device;

uploading the current state of the mobile phone device from the mobile phone device in response to a determination that the state of the mobile phone device stored in the storage associated with the software widget configuration application does not match the current state of the mobile phone device; and uploading the state of the mobile phone device stored in the memory in response to a determination that the state of the mobile phone device stored in the storage associated with the software widget configuration application matches the current state of the mobile phone.

12. The computer implemented method of claim 9, further comprising selecting the software widget from a software widget repository.

13. The computer implemented method of claim 9, wherein updating the configuration comprises generating code based on user preferences selected while the simulated software widget is displayed via the user interface by the software widget configuration application, and wherein the code enables the mobile phone device to execute the software widget based on the user preferences.

14. The computer implemented method of claim 9, further comprising storing at least one of the state or the configuration updates in a storage associated with the software widget configuration application.

* * * * *